United States Patent [19]
Uwazumi et al.

[11] Patent Number: 5,843,561
[45] Date of Patent: Dec. 1, 1998

[54] MAGNETIC RECORDING MEDIUM AND METHOD FOR MANUFACTURING THE SAME

[75] Inventors: Hiroyuki Uwazumi; Naoki Takizawa; Noboru Kurata, all of Nagano, Japan

[73] Assignee: Fuji Electric Co., Ltd., Japan

[21] Appl. No.: 639,676

[22] Filed: Apr. 29, 1996

Related U.S. Application Data

[63] Continuation-in-part of Ser. No. 576,346, Dec. 21, 1995, abandoned.

[30] Foreign Application Priority Data

Dec. 22, 1994 [JP] Japan ................................. 6-320358
Dec. 20, 1995 [JP] Japan ................................. 7-331269

[51] Int. Cl.$^6$ ........................................................ G11B 5/66
[52] U.S. Cl. ..................... 428/141; 428/336; 428/694 T; 428/694 TS; 428/694 TR; 428/694 SG; 428/900; 427/127; 427/128; 427/129; 427/131; 427/132; 204/192.2
[58] Field of Search ...................... 428/694 T, 694 TS, 428/694 TR, 694 SG, 900, 141, 336; 204/192.2; 427/127, 128, 132, 129, 131

[56] References Cited

U.S. PATENT DOCUMENTS

| | | | |
|---|---|---|---|
| 4,939,045 | 7/1990 | Yoshida | 428/664 |
| 5,413,835 | 5/1995 | Ikeda | 428/141 |
| 5,427,867 | 6/1995 | Kogure | 428/611 |
| 5,474,830 | 12/1995 | Yamaguchi | 428/141 |
| 5,482,785 | 1/1996 | Mahvan et al. | 428/611 |
| 5,506,017 | 4/1996 | Ranjan | 428/65.7 |
| 5,550,686 | 8/1996 | Nguyen | 360/135 |

*Primary Examiner*—Leszek Kiliman
*Attorney, Agent, or Firm*—Rossi & Associates

[57] ABSTRACT

A magnetic recording medium includes an uneven layer, a non-magnetic metal base layer, a magnetic layer and a protective layer which are laminated on a non-magnetic base in the order of description. The uneven layer includes non-magnetic metal deposits containing nitrogen or oxygen, and consists of mutually isolated protrusions having a crystalline phase, which are discretely dispersed on the surface of the non-magnetic base, and a connecting layer having an amorphous phase for filling spaces between the protrusions so as to connect the protrusions with each other.

11 Claims, 10 Drawing Sheets ent application Ser. No. 08/576,346 filed on Dec. 21,
MAGNETIC RECORDING MEDIUM AND METHOD FOR MANUFACTURING THE SAME

CROSS-REFERENCE TO RELATED APPLICATIONS

This application is a continuation-in-part application of U.S. patent application Ser. No. 08/576,346 filed on Dec. 21, 1995, now abandoned, the contents of which are herein incorporated by reference, entitled "Magnetic Recording Medium and Method for Manufacturing the Same" by Uwazumi et al.

FIELD OF THE INVENTION

The present invention relates to a magnetic recording medium for use with a fixed magnetic disc device, for example, and a method of manufacturing the recording medium, and more particularly to a technique where the magnetic recording medium is formed at its outermost surface with minute irregularities, so as to assure a small flotation distance with respect to a magnetic head, and thus achieve a sufficiently high recording density of the recording medium.

BACKGROUND OF THE INVENTION

A magnetic recording medium or magnetic disc used with a fixed magnetic disc device, such as a hard disc drive (HDD), generally has a laminar structure as shown in FIG. 14. In the magnetic recording medium, a non-magnetic metal base layer 2, a magnetic layer 3 made of a ferromagnetic alloy, such as CoCrTa, and a protective layer 4 formed from amorphous carbon, for example, are successively laminated on a non-magnetic base 1 in the order of description. The recording medium further includes a lubrication layer 5 comprising a liquid lubrication agent, which is formed on the protective layer 4. The non-magnetic base 1 may consist of a mirror-ground glass substrate, or a Si or carbon substrate.

Generally, magnetic disc drives employ a contact-start-stop (CSS) system to read and write information, in which system a magnetic head in operation floats slightly above a surface of a magnetic recording medium to read or write information. In this CSS system, the magnetic head is in contact with the magnetic recording medium while it is not operated, and therefore a mirror-like or smooth surface of the magnetic recording medium results in a high coefficient of friction between the magnetic head and the recording medium surface, causing the magnetic head to stick to the medium surface. Further, upon start of operation, the magnetic layer may be worn off due to a large frictional force caused upon a sliding action of the magnetic head over the magnetic recording medium surface. In view of these problems, the surface of the non-magnetic base 1 of the magnetic recording medium is roughened or formed with protrusions and recesses, thereby to lower a coefficient of friction between the magnetic head and the magnetic recording medium surface.

On the other hand, the surface roughness of the magnetic recording medium needs to be limited to a certain degree, so as to reduce the flotation height of the magnetic head to meet with the recent trend of a higher recording density and a larger capacity of magnetic recording media. Thus, the surface roughness of the medium surface must be precisely controlled so as to satisfy both of the requirements for a reduced coefficient of friction with the magnetic head and a reduced flotation height of the magnetic head.

In an attempt to accomplish the above requirements, there have been suggested a magnetic recording medium having a non-magnetic substrate whose surface is textured with mechanically formed protrusions and recesses, or is roughened by various methods.

For example, JP-A-4-255908 discloses a magnetic recording medium in which minute protrusions made of a low-melting-point metal are formed discontinuously on a film formed by electroless plating on a non-magnetic substrate. Another example is disclosed in JP-A-4-255909 in which island-like protrusions made of a low-melting-point metal are formed discontinuously on a glass substrate via a metal film having a low surface energy. A further example is disclosed in U.S. Pat. No. 5,134,038 in which a transient liquid metal layer made of a low-melting-point metal is deposited on a substrate so as to form an uneven medium surface. Further, JP-A-4-241222 and JP-A-4-247323 disclose forming an aluminum film by sputtering in an argon gas to provide an uneven medium surface.

FIG. 15 shows another example of magnetic recording medium as disclosed in JP-A-3-73419. This recording medium has a glass substrate 1a, mutually isolated (island-like) protrusions 6 formed on the glass substrate 1a and made of a low-melting-point metal, such as aluminum, and an oxygen trap layer 7 in the form of a titanium film formed over the protrusions 6 and local areas of the glass substrate 1a which are not covered with the protrusions 6. The protrusions 6 are discontinuously disposed in the radially inward direction of the recording medium or disc. The recording medium further includes a metal base layer 2 made of chromium, a magnetic layer 3, and a protective layer 4 made of amorphous carbon, which are successively formed on the oxygen trap layer 7 in the order of description. The shapes of the mutually isolated protrusions 6 made of aluminum or other low-melting-point metal are lo reflected up to the medium surface, and irregularities thus formed on the medium surface serve to reduce the friction between the medium and a magnetic head during a CSS operation. In this magnetic recording medium, the surface of the substrate 1a is not entirely covered with the material of the protrusions 6, but is discretely covered, thus making the substrate surface locally exposed. Therefore, the oxygen trap layer 7 or the chromium base layer 2 in the absence of the layer 7 is directly attached to and adheres to the glass substrate 1a, so as to envelop or cover the protrusions 6 and hold them against the glass substrate 1a. This prevents the protrusions 6 from easily peeling off from the substrate 1a.

However, the above-described recording medium structure including the mutually isolated protrusions 6 as shown in FIG. 15 suffers from some problems as described below. That is, the protrusions 6 consist of low-melting-point metal deposits that are mutually isolated or completely separated from each other and disposed discontinuously in the radially inner direction of the recording medium. Therefore, its upper layer, that is, the oxygen trap layer 7 or the chromium base layer 2 in the absence of the layer 7, adheres to both the protrusions 6 and the glass substrate 1a. To assure a high adhesive strength, therefore, there is a limit to a choice of the materials for the upper and lower layers adjacent to the protrusions 6.

To solve the above problem, a complicated laminar structure is needed to produce a desired magnetic recording medium, which increases the cost of manufacturing the recording medium. In actual application of the medium structure as shown in FIG. 15, the oxygen trap layer 7 needs to be replaced by a non-magnetic metal layer formed on the glass substrate 1a. This layer serves as a heat reservoir for maintaining the temperature of the glass substrate 1a, and as a barrier metal for preventing blowing-up of organic substances in the glass substrate. If this non-magnetic metal layer and metal base layer 2 are formed of the same metal, the protrusions 6 can be most effectively prevented from peeling off due to the highest adhesive strength between the upper and lower layers made of the same metal. However, since the protrusions 6 are made of a low-melting-point metal, the non-magnetic metal layer cannot satisfactorily function as a heat reservoir and a barrier metal if the upper layer, i.e., metal base layer 2, covering the low-melting-point metal deposits and the non-magnetic metal layer are made of the same metal.

SUMMARY OF THE INVENTION

In the light of the above problems, it is an object of the present invention to provide a magnetic recording medium having an uneven layer of metal deposits on a non-magnetic base, in which the uneven layer has an improved structure which effectively prevents peeling of the uneven layer away from the non-magnetic base, allowing increased freedom in selecting materials for upper and lower layers adjacent to the uneven layer, and achieving a simple laminar structure suitable for mass production. It is also an object of the invention to provide a method of producing the magnetic recording medium as described above.

The above object may be attained according to one aspect of the present invention, which provides a magnetic recording medium comprising: a non-magnetic base; an uneven layer including non-magnetic metal deposits containing at least one of nitrogen and oxygen, laminated on a surface of the non-magnetic base, wherein the uneven layer includes mutually isolated protrusions having a crystalline phase, which are discretely dispersed on the surface of the non-magnetic base, and a connecting layer having an amorphous phase for filling spaces between the protrusions so as to connect the protrusions with each other; a non-magnetic metal base layer laminated on the uneven layer; a magnetic layer laminated on the non-magnetic metal base layer; and a protective layer laminated on the magnetic layer. The non-magnetic metal deposits may contain nitrogen or oxygen, or may contain both of nitrogen and oxygen. The metal deposits are preferably made of a single metal selected from a group consisting of Al, Ta, Ti, Ag, Cu, Pb, Si, B, Zr and Cr, or an alloy of two or more of these metals. The non-magnetic base preferably comprises a non-magnetic substrate and a non-magnetic metal buffer layer laminated on the non-magnetic substrate. When the metal deposits are made of aluminum, in particular, the mutually isolated protrusions have a maximum diameter in a range of 10 nm to 300 nm.

The above object may be attained according to another aspect of the present invention, which provides a method of manufacturing the magnetic recording medium having an uneven layer of metal deposits consisting of discretely dispersed, mutually isolated protrusions having a crystalline phase, and a connecting layer having an amorphous phase for connecting the protrusions with each other, which method includes a step of forming the uneven layer by a sputtering process conducted in a sputtering gas mixture comprising an argon gas and a nitrogen gas, with the non-magnetic base heated to a predetermined temperature. When the metal deposits are made of aluminum, the predetermined temperature to which the non-magnetic base is heated is desirably within a range of 150° C. to 350° C., and the sputtering gas mixture desirably has a partial pressure ratio of the nitrogen gas in a range of 2% to 35%.

The above object may be also attained according to a further aspect of the present invention, which provides a method of manufacturing a magnetic recording medium, comprising the steps of: forming an uneven layer including non-magnetic metal deposits containing oxygen on a surface of a non-magnetic base, by a sputtering process conducted in a sputtering gas mixture comprising an argon gas and an oxygen gas, with the non-magnetic base heated to a predetermined temperature, the uneven layer including mutually isolated protrusions having a crystalline phase, which are discretely dispersed on the surface of the non-magnetic base, and a connecting layer having an amorphous phase for filling spaces between the protrusions so as to connect the protrusions with each other; laminating a non-magnetic metal base layer on the uneven layer; laminating a magnetic layer on the non-magnetic metal base layer; and laminating a protective layer on the magnetic layer. When the metal deposits are made of Al, the predetermined temperature to which the non-magnetic base is desirably heated is within a range of 150° C. to 500° C., and the sputtering gas mixture desirably has a partial pressure ratio of the oxygen gas in a range of 0.5% to 35%.

While the uneven layer of the magnetic recording medium according to the present invention takes the form of metal deposits containing nitrogen or oxygen, the uneven layer includes not only discretely distributed, mutually isolated protrusions having a crystalline phase, but also a connecting layer having an amorphous phase, which fills spaces between the protrusions with a small thickness so as to connect them with each other. Since the crystalline-phase protrusions are partly embedded in the amorphous-phase connecting layer such that the protrusions are discretely distributed over the surface of the non-magnetic base, parts of the mutually isolated protrusions which protrude from the connecting layer are reflected up to the medium surface, which is thus provided with protrusions and recesses. The amorphous-phase connecting layer, which is in the form of a continuous film for connecting the mutually isolated protrusions with each other, ensures high adhesive strength with respect to upper and lower layers adjacent to the uneven layer. In particular, the adhesive strength between the amorphous-phase connecting layer and the upper and lower layers is higher than that between the crystalline-phase protrusions and the upper and lower layers, whereby the uneven layer is effectively prevented from peeling off. Since the entire surface of the non-magnetic base is completely covered with the uneven layer which as a whole constitutes a continuous film, the uneven layer serves as an isolation film, that is, the non-magnetic base does not directly contact with the upper layer laminated on the uneven layer. This advantageously reduces a limit to a choice of the materials for the upper and lower layers sandwiching the uneven layer. For example, the non-magnetic metal buffer layer formed on the non-magnetic substrate of the base may be formed of the same material as the non-magnetic metal base layer, assuring an improved manufacturing efficiency.

Since the irregularities formed by the crystalline-phase protrusions of the metal deposits distributed as described above are reflected up to the surface of the protective layer of the magnetic recording medium, the recording medium has small surface roughness, permitting a sufficiently small flotation distance of a magnetic head that floats above the recording medium. In addition, the coefficient of friction between the magnetic recording medium and the magnetic head can be reduced, assuring excellent sliding characteristics including high resistance to contact-stop-start (CSS) motions. Thus, the magnetic recording medium according to the present invention can be advantageously used with various types of magnetic heads to achieve a high recording density.

Since the irregularities formed on the surface of the protective layer are derived from the irregular or uneven shape of the uneven layer consisting of metal deposits, the surface roughness of the protective layer can be controlled to a desired value by suitably controlling the shape of the uneven layer. More specifically, if the crystalline-phase protrusions discretely distributed in the uneven layer in the form of aluminum deposits containing nitrogen has the maximum diameter in the range of 10 nm to 300 nm, the maximum height (surface roughness) "Rmax" of the protective layer can be limited to the range of 10 nm to 50 nm, enabling a magnetic head to float above the recording medium with a flotation distance in the range of 0.6 μinch to 2.5 μinch, while at the same time satisfying required tribology with the magnetic head. The structure and shape of the metal deposits can be controlled by employing sputtering as a film-forming process. In the case of forming the uneven layer from the aluminum deposits containing nitrogen, if the non-magnetic base is heated to a temperature in the range of 150° C. to 350° C., and the sputtering gas mixture comprising an argon gas and a nitrogen gas has a partial pressure ratio of the nitrogen gas in the range of 2% to 35%, the coefficient of friction "$\mu$" can be controlled to 0.3 or lower, and the maximum roughness Rmax of the medium surface can be held in the range of 10 nm to 50 nm. Thus, the resulting magnetic recording medium is excellent in terms of both the friction characteristic and the flotation characteristic.

In the case of forming the uneven layer from the aluminum deposits containing oxygen, if the non-magnetic base is heated to a temperature in the range of 150° C. to 500° C., and the sputtering gas mixture comprising an argon gas and an oxygen gas has a partial pressure ratio of the oxygen gas in the range of 0.5% to 35%, the coefficient of friction "$\mu$" can be controlled to 0.3 or lower, and the maximum roughness Rmax of the medium surface can be held in the range of 10 nm to 50 nm. Thus, the resulting magnetic recording medium is excellent in terms of both the friction characteristic and the flotation characteristic.

BRIEF DESCRIPTION OF THE DRAWINGS

The above and optional objects, features and advantages of the present invention will be better understood by reading the following detailed description of a presently preferred embodiment of the invention, when considered in conjunction of the accompanying drawings, in which:

FIG. 2(a) is a view showing the irregular surface condition of an uneven layer of the first embodiment as viewed by an atomic force microscope (AFM), when the uneven layer was formed with the partial pressure ratio Pn of $N_2$ gas being equal to 3%, while

FIG. 3(a) is a view showing the irregular surface condition of the uneven layer of the first embodiment as viewed by the atomic force microscope (AFM), when the uneven layer was formed with the partial pressure ratio PN of $N_2$ gas being equal to 20%, while

FIG. 4(a) is a view showing the irregular surface condition of the uneven layer of the first embodiment as viewed by the atomic force microscope (AFM), when the uneven layer was formed with the partial pressure ratio PN of $N_2$ gas being equal to 0%, while

FIG. 5(a) is a view showing the irregular surface condition of the uneven layer of the first embodiment as viewed by the atomic force microscope (AFM), when the uneven layer was formed with the partial pressure ratio PN of $N_2$ gas being equal to 50%, while

FIG. 8(a) is a view showing the irregular surface condition of an uneven layer of the second embodiment as viewed by an atomic force microscope (AFM), when the uneven layer was formed with the partial pressure ratio Pn of $O_2$ gas being equal to 3%, while

FIG. 9(a) is a view showing the irregular surface condition of the uneven layer of the second embodiment as viewed by the atomic force microscope (AFM), when the uneven layer was formed with the partial pressure ratio PN of $O_2$ gas being equal to 20%, while

FIG. 10(a) is a view showing the irregular surface condition of the uneven layer of the second embodiment as viewed by the atomic force microscope (AFM), when the uneven layer was formed with the partial pressure ratio PN of $O_2$ gas being equal to 0%, while

FIG. 11(a) is a view showing the irregular surface condition of the uneven layer of the second embodiment as viewed by the atomic force microscope (AFM), when the uneven layer was formed with the partial pressure ratio PN of $O_2$ gas being equal to 50%, while

DETAILED DESCRIPTION OF THE PREFERRED EMBODIMENTS

Figure 1:
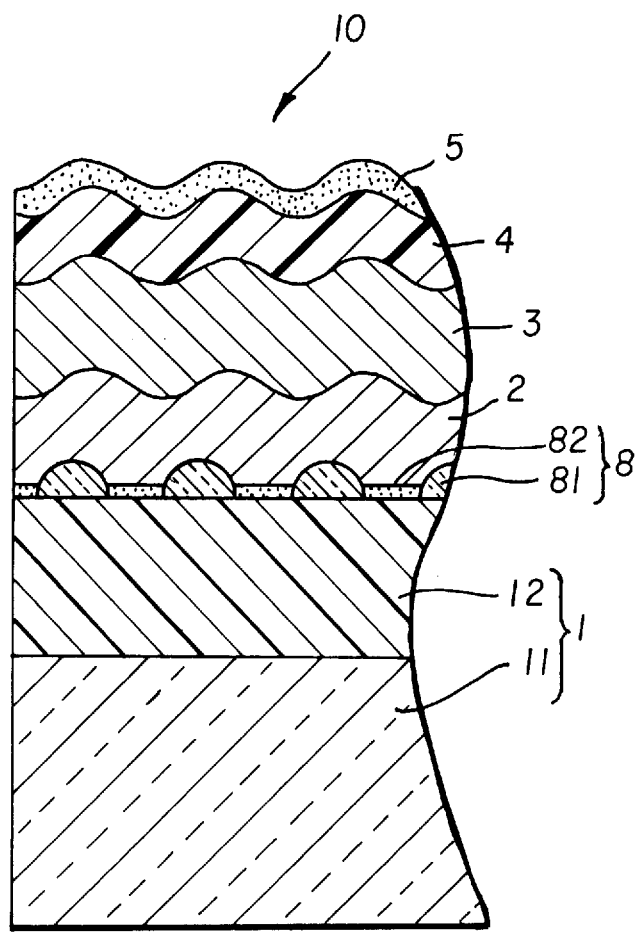
FIG. 1 is a cross sectional view schematically showing a magnetic recording medium constructed according to one embodiment of the present invention.

FIG. 1 is a cross sectional view schematically showing a magnetic recording medium 10 according to one embodiment of the present invention. The magnetic recording medium or magnetic disc 10 includes a non-magnetic base 1 consisting of a glass substrate 11 and a non-magnetic metallic buffer layer 12 made of chromium, for example, and a non-magnetic uneven or irregular layer 8 in the form of metal deposits made of aluminum or other metal and containing nitrogen or oxygen. The uneven layer 8 is not formed with a uniform thickness on the entire surface area of the non-magnetic metallic buffer layer 12. Rather, the uneven layer 8 consists of mutually isolated protrusions 81 having a crystalline phase, and a connecting layer 82 having an amorphous phase. The protrusions 81 are formed of a non-magnetic metal which locally aggregates and is discretely distributed, while the connecting layer 82 is formed to fill spaces between the protrusions 81 to thereby connect them with each other. That is, the protrusions 81 with the crystalline phase are mutually isolated films which are discontinuously disposed in the radially inward direction of the magnetic disc, and the connecting layer 82 with the amorphous phase is a continuous film connecting the protrusions 81. On the non-magnetic uneven layer 8, there are further laminated a non-magnetic metal base layer 2, a magnetic layer 3 and a protective layer 4 in the order of description. Lubrication layer 5 comprising a liquid lubrication agent is formed on the surface of the protective layer 4. The irregularities of the surface of the uneven layer 8 are reflected up to the surface of the lubrication layer 5 formed on the protective layer 4, whereby the magnetic recording medium 10 is formed at its surface with minute protrusions and recesses.

Embodiment 1

There will be described a method of manufacturing the magnetic recording medium 10 having the uneven layer 8 in the form of aluminum deposits containing nitrogen.

Initially, a mirror-finished, disc-like glass substrate 11 is subjected to precision rinsing, set on a holder, and then fed to a charging chamber of an inline-type magnetoron sputtering device. Then, this charging chamber is evacuated to a vacuum of $5 \times 10^{-6}$ Torr or lower, and the glass substrate 11 is heated. Thereafter, the holder with the glass substrate 11 is fed to a film-forming chamber A, which is filled with an (Ar+N$_2$) gas at a pressure of 20 mTorr. In this chamber A, a non-magnetic metallic buffer layer 12 consisting of chromium and nitrogen and having a thickness of 20 nm is formed by sputtering on the surface of the glass substrate 11, to thus produce the base 1. Since the glass substrate 11 has a strong heat-sink characteristic, the non-magnetic metallic buffer layer 12 serves as a heat reservoir having a sufficiently large heat capacity so that the temperature of the base is kept high during the following film-forming process. The buffer layer 12 also serves as a barrier metal for preventing blowing-up of organic gasses in the glass substrate 11.

Subsequently, a non-magnetic uneven layer 8 in the form of aluminum deposits containing nitrogen is formed by sputtering on the non-magnetic metallic buffer layer 12 of the base 1, using a non-magnetic metal, aluminum, as a target. The temperature of the base 1 is controlled to T° C. during formation of the uneven layer 8, and the ratio of the partial pressure of a N$_2$ gas to that of the (Ar+N$_2$) gas is controlled to Pn. T° C. and Pn will be described later in detail.

In the next step, the holder carrying the base 1 on which the uneven layer 8 comprising aluminum deposits is formed is fed to a film-forming chamber B, and the base 1 is heated to 320° C. Subsequently, a 100 nm-thickness, non-magnetic metal base layer 2 made of chromium, a 20 nm-thickness, magnetic layer 3 formed from a ferromagnetic alloy, more specifically, Co$_{86}$Cr$_{12}$Ta$_2$ alloy, and a 20 nm-thickness protective layer 4 formed from amorphous carbon, for example, are formed by sputtering in the order of description. Then, the surface of the protective layer 4 is coated with a liquid lubrication agent comprising perfluoropolyether, to thus form a lubrication layer 5 having a thickness of about 1.5 nm. Thus, the magnetic recording medium 10 is produced.

Figure 2A:
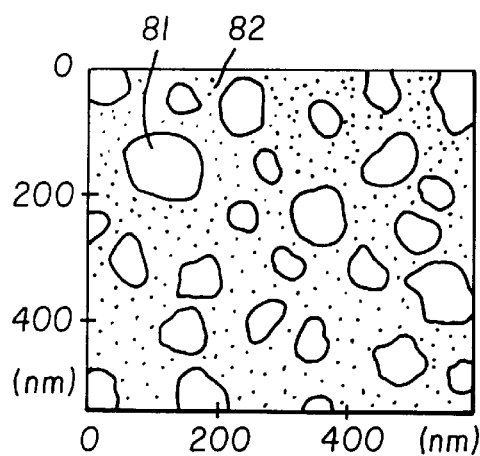
Figure 2B:
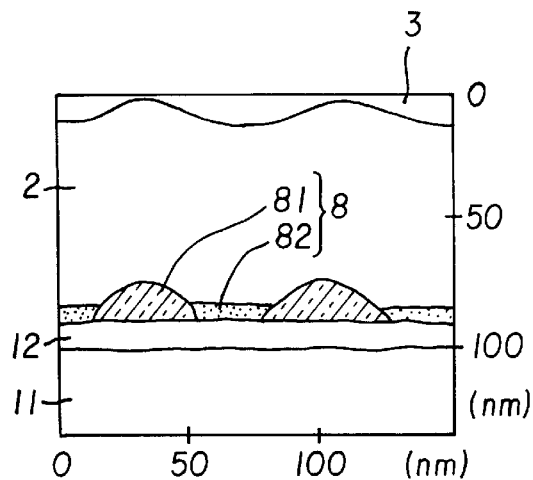
FIG. 2(b) is a view showing a cross section of the uneven layer as viewed by a transmission electron microscope (TEM)
Figure 3A:
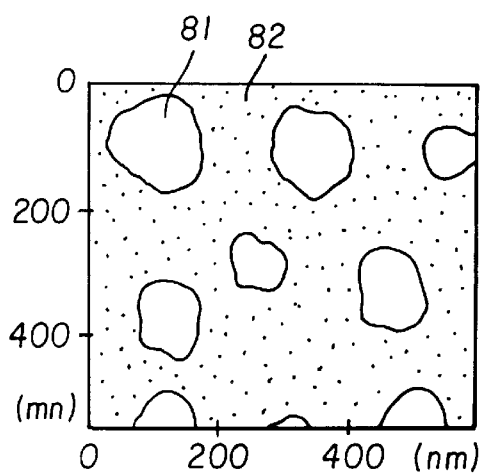
Figure 3B:
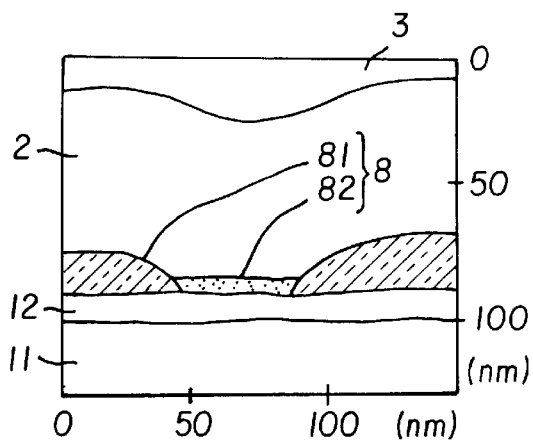
FIG. 3(b) is a view showing a cross section of the uneven layer as viewed by a transmission electron microscope (TEM)
Figure 4A:
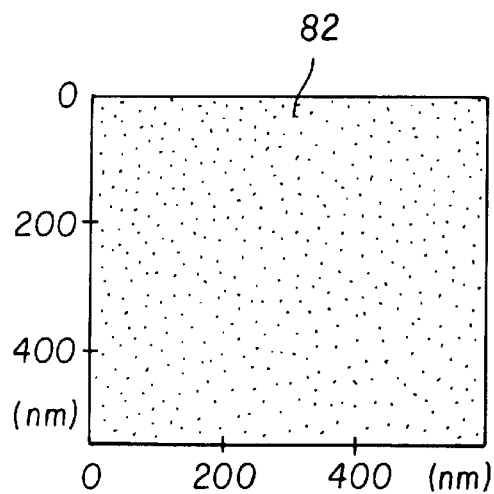
Figure 4B:
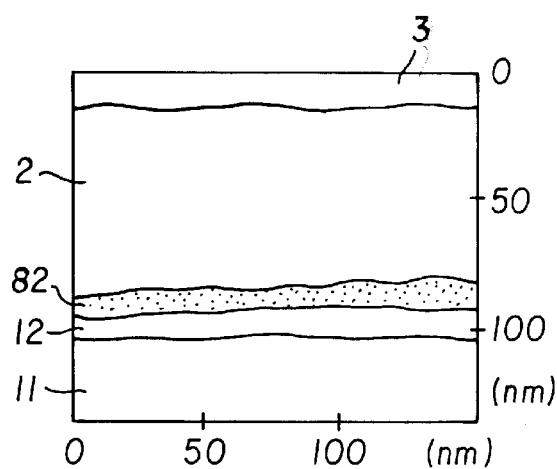
FIG. 4(b) is a view showing a cross section of the uneven layer as viewed by a transmission electron microscope (TEM)
Figure 5A:
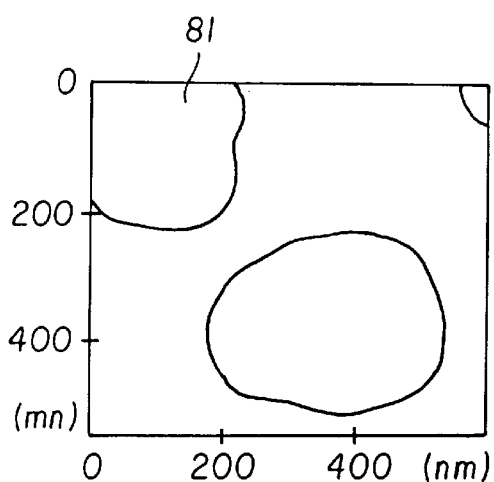
Figure 5B:
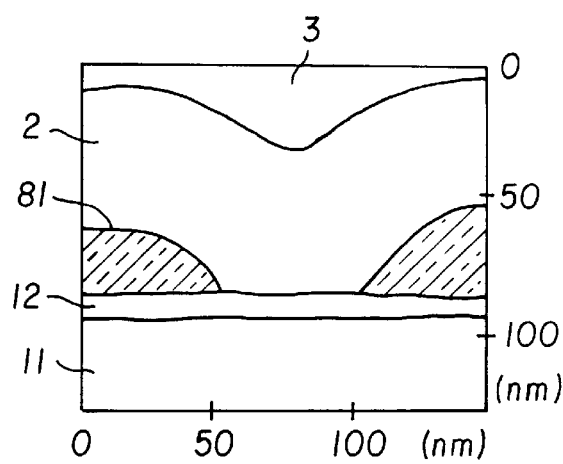
FIG. 5(b) is a view showing a cross section of the uneven layer as viewed by a transmission electron microscope (TEM)

FIG. 2(a) through FIG. 5(a) schematically show the surface condition of the uneven layer 8 formed on the non-magnetic metal buffer layer 12 as observed by an atomic force microscope (AFM). FIG. 2(b) through FIG. 5(b) schematically show the cross section of a relevant portion of the magnetic recording medium 10 as observed by a transmission electron microscope (TEM). The uneven layers 8 consisting of aluminum deposits as shown in FIGS. 2 to 5 were formed with different partial pressure ratios Pn of the N$_2$ gas to the (Ar+N$_2$) gas. That is, the uneven layers 8 as shown in FIGS. 2 and 3 were formed with Pn being equal to 3% and 20%, respectively. For comparison, the uneven layers 8 as shown in FIGS. 4 and 5 were formed with Pn being equal to 0% and 50%, respectively.

Figure 15:
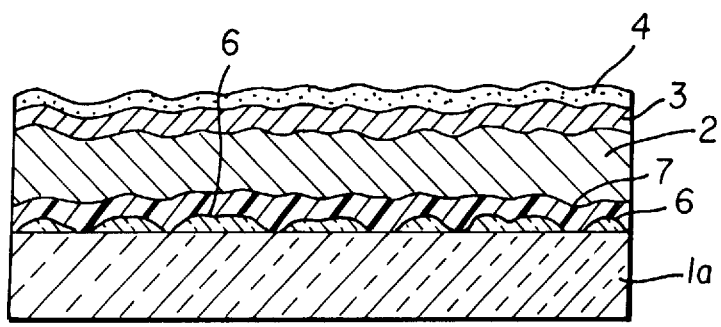
FIG. 15 is cross sectional view of the laminar structure of the magnetic recording medium as disclosed in JP-A-3-73419.

As shown in FIGS. 2 through 5, the unevenness or irregularities of the uneven layer 8 as the aluminum deposits containing nitrogen is given by the crystalline-phase, mutually isolated protrusions 81 discretely distributed in the amorphous-phase connecting layer 82, which thus forms a continuous film for connecting the protrusions 81. As is apparent from FIGS. 2, 3 and 5, the diameter (grain size) of the crystalline-phase protrusions 81 tends to increase with the partial pressure ratio Pn of the N$_2$ gas to the (Ar+N$_2$) gas. If the aluminum deposits (8) do not contain nitrogen as in the example of FIG. 4, on the other hand, the uneven layer 8 formed from the aluminum deposits consists of a single amorphous-phase layer 82 having minute protrusions and recesses, which is reflected at the protective layer 4 as a substantially smooth surface as shown in FIG. 4. In this case, the magnetic recording medium 10 cannot achieve a sufficiently low coefficient of friction. If the aluminum deposits (8) contain a large amount of nitrogen, as in the example of FIG. 5, the uneven layer 8 formed from the aluminum deposits consists solely of discretely distributed, mutually isolated protrusions 81 with the crystalline phase, which form protrusions and recesses of larger size and are similar to those of the conventional uneven layer 6 as shown in FIG. 15. Each of the uneven layers 8 as shown in FIGS. 2 and 3 consists of the crystalline-phase, mutually isolated protrusions 81 having a suitable particle size, and the amorphous-phase connecting layer 82 which fills spaces between the protrusions 81 with a relatively small thickness. Since the amorphous-phase connecting layer 82 forms a continuous film for connecting the discretely dispersed, mutually isolated protrusions 81 with each other, the uneven layer 8 exhibits excellent adhesiveness with respect to its upper and lower layers, that is, the metal base layer 2 and the non-magnetic metal buffer layer 12. More specifically, the amorphous-phase portion 82 of the uneven layer 8 exhibits a higher adhesive strength with respect to the upper and lower layers 2, 12, than the crystalline-phase portion 81 thereof. Therefore, the uneven layer 8 is effectively prevented from peeling off from these layers 2, 12. In the present examples of FIGS. 2 and 3, the entire surface of the buffer layer 12 is covered with the uneven layer 8 as a continuous film, which serves as an isolation film, with the result of no contact between the buffer layer 12 and the metal base layer 2. Accordingly, the present magnetic recording medium can be constructed without carefully considering the compatibility of materials for the upper and lower layers 2, 12 adjacent to the uneven layer 8. Therefore, the same material, such as chromium, can be used for forming both the non-magnetic metal buffer layer 12 and the non-magnetic metal base layer 2, and the film-forming process is thus simplified, resulting in an improved manufacturing efficiency.

With respect to the magnetic recording medium having the uneven layer 8 in the form of aluminum deposits containing nitrogen, the maximum crystal grain size D of the crystalline-phase layer 81 was varied, and some characteristics of the resulting magnetic recording medium 10 were observed. The results of this test are shown in TABLE 1.

TABLE 1

| D (nm)                  | 3   | 7   | 10 | 100 | 300 | 350 |
|-------------------------|-----|-----|----|-----|-----|-----|
| Rmax (nm)               | 5.5 | 8.6 | 10 | 27  | 50  | 62  |
| $\mu$                   | X   | Δ   | ○  | ○   | ○   | ○   |
| Flotation characteristic| ○   | ○   | ○  | ○   | ○   | X   |

As seen in the TABLE 1 above, the test included measurements of the maximum roughness of the surface of the protective layer 4 as represented by "Rmax", and a coefficient of friction as represented by "$\mu$", which was measured after a CSS (contact-start-stop) motion was conducted 50,000 times, using a thin-film magnetic head ($Al_2O_3$—TiC slider). Further, a flotation test of the thinfilm magnetic head was conducted with a distance of 1.5 $\mu$inch with respect to the magnetic recording medium, to check if any head crash occurred or not.

With respect to the coefficient of friction "$\mu$" in the above TABLE 1, "○" indicates that "$\mu$" was equal to or smaller than 0.3, and "Δ" indicates that "$\mu$" was larger than 0.3 and equal to or smaller than 0.7, while "X" indicates that the coefficient of friction "$\mu$" was larger than 0.7. With respect to the flotation characteristic in the same table, "○" indicates that the magnetic head did not contact with protrusions on the recording medium, and "X" indicates that the magnetic head contacted with the protrusions on the recording medium.

It will be understood from TABLE 1 that the surface roughness of the magnetic recording medium as represented by "Rmax" increases with the crystal grain size "D". Accordingly, the recording medium has a relatively smooth surface when the crystal grain size "D" is small, which means that the magnetic head is excellent in terms of its flotation characteristic, but is poor in its friction characteristic. On the other hand, the recording medium has a relative rough surface when "D" is large, which means that the magnetic head is excellent in terms of the friction characteristic, but is poor in the flotation characteristic. To achieve a magnetic recording medium which is satisfactory both in the friction characteristic and floating characteristic, the maximum roughness "Rmax" needs to be controlled to be within the range of 10 nm to 50 nm. To this end, the maximum diameter "D" of the crystalline-phase protrusions 81 of the uneven layer 8 is preferably controlled to be within the range of 10 nm to 300 nm. The graph of FIG. 6 shows changes of the maximum roughness "Rmax" of the magnetic recording medium, and the coefficient of friction "$\mu$" as measured after the CSS motion was conducted 50,000 times, as the partial pressure ratio "Pn" of the $N_2$ gas in the ($Ar+N_2$) gas used during formation of the uneven layer 8 was varied.

Figure 6:
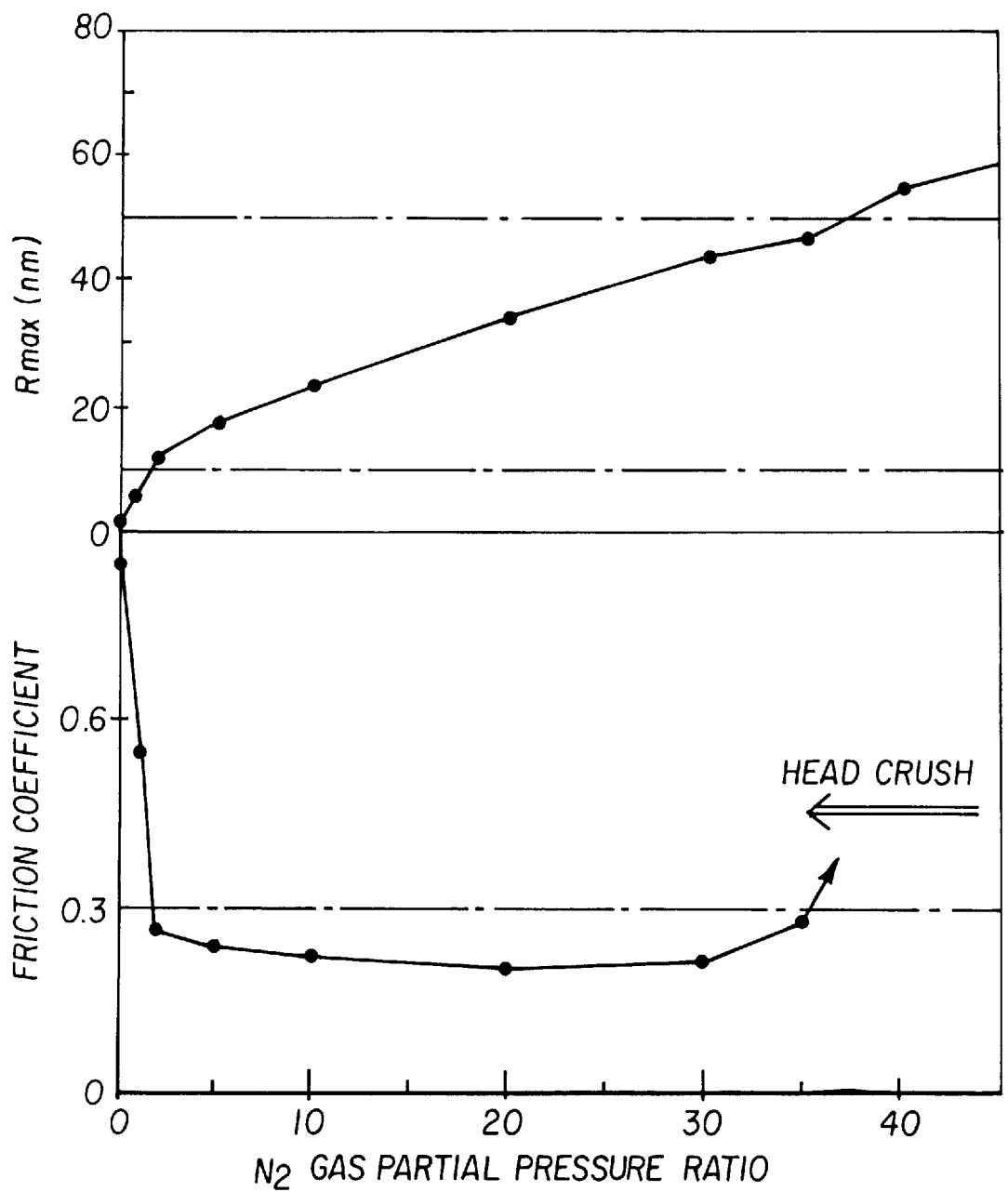
FIG. 6 is a graph showing changes of the maximum roughness "Rmax" of the magnetic recording medium, and the coefficient of friction "$\mu$" as measured after the CSS motion was conducted 50,000 times, as the partial pressure ratio "Pn" of $N_2$ gas in (Ar+$N_2$) gas used during formation of the uneven layer of the first embodiment was varied.

When the uneven layer 8 was formed with the partial pressure ratio "Pn" of the $N_2$ gas being in the range of 2 to 35%, the coefficient of friction "$\mu$" was advantageously 0.3 or lower, and the maximum roughness of the medium surface was kept in the range of 10 nm and 50 nm, as shown in FIG. 6. Thus, the resulting magnetic recording medium was excellent both in its friction characteristic and flotation characteristic, as is apparent from TABLE 1 above.

If the partial pressure ratio of the $N_2$ gas is less than 2%, the uneven layer 8 consists solely of the amorphous-phase connecting layer 82 with considerably minute protrusions and recesses, as shown in FIG. 4, resulting in an excessively large coefficient of friction. If the partial pressure ratio of the $N_2$ gas exceeds 35%, the uneven layer 8 consists solely of large-sized, discretely dispersed and mutually isolated protrusions 81 with the crystalline phase, as shown in FIG. 5. When a CSS test was conducted on this recording medium, the uneven layer 8 peeled off from the upper and lower layers, and a head crush occurred.

Figure 7:
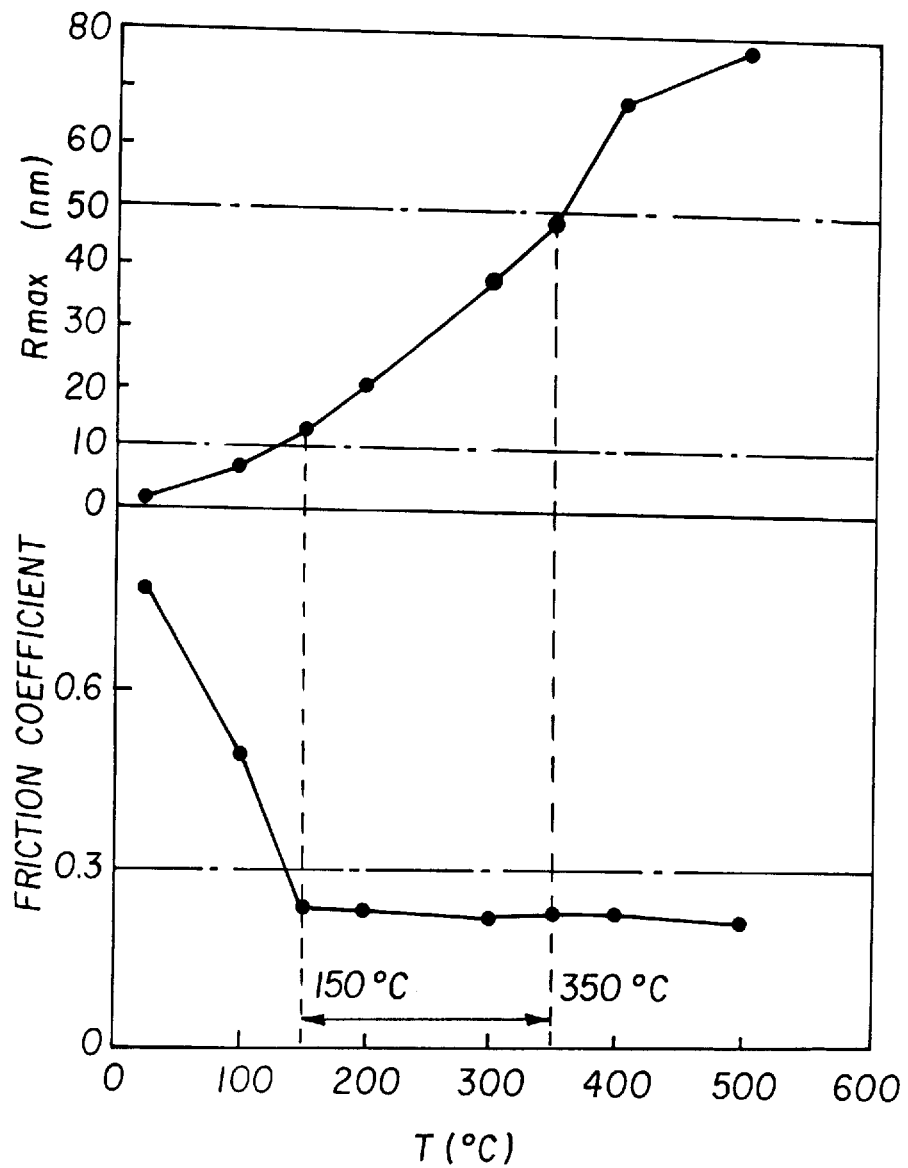
FIG. 7 is a graph showing changes of the maximum roughness "Rmax" of the magnetic recording medium, and the coefficient of friction "$\mu$" as measured after the CSS motion was conducted 50,000 times, as the temperature "T" of a glass substrate as measured during formation of the uneven layer of the first embodiment was varied.

The graph of FIG. 7 shows changes of the maximum roughness "Rmax" of the magnetic recording medium, and the coefficient of friction "$\mu$" as measured after the CSS motion was conducted 50,000 times, as the temperature "T" of the base 1 as measured during formation of the uneven layer 1 was varied.

When the uneven layer 8 was formed with the temperature "T" of the base 1 being in the range of 150° to 350° C., the coefficient of friction "$\mu$" was advantageously 0.3 or lower, and the maximum roughness of the medium surface was kept in the range of 10 nm and 50 nm, as shown in FIG. 6. Thus, the resulting magnetic recording medium was excellent both in its friction characteristic and flotation characteristic, as is apparent from TABLE 1 above.

Embodiment 2

There will be described a method of manufacturing the magnetic recording medium 10 having the uneven layer 8 in the form of aluminum deposits containing oxygen.

Initially, a mirror-finished, disc-like glass substrate 11 is subjected to precision rinsing, set on a holder, and then fed to a charging chamber of an inline-type magnetoron sputtering device, in the same manner as in the first embodiment. Then, this charging chamber is evacuated to a vacuum of $5\times10^{-6}$ Torr or lower, and the glass substrate 11 is heated. Thereafter, the holder with the glass substrate 11 is fed to a film-forming chamber A, which is filled with an ($Ar+O_2$) gas for sputtering at a pressure of 10 mTorr. In this chamber A, a non-magnetic metallic buffer layer 12 consisting of chromium and oxygen and having a thickness of 20 nm is formed by sputtering on the surface of the glass substrate 11, to thus produce the base 1. Since the glass substrate 11 has a strong heat-sink characteristic, the non-magnetic metallic buffer layer 12 serves as a heat reservoir having a sufficiently large heat capacity so that the temperature of the base is kept high during the following film-forming process. The buffer layer 12 also serves as a barrier metal for preventing blowing-up of organic gasses in the glass substrate 11.

Subsequently, a non-magnetic uneven layer 8 in the form of aluminum deposits containing oxygen is formed by sputtering on the non-magnetic metallic buffer layer 12 of the base 1, using a non-magnetic metal, aluminum, as a target. The temperature of the base 1 is controlled to T° C. during formation of the uneven layer 8, and the ratio of the partial pressure of an $O_2$ gas to that of the (Ar+$O_2$) gas is controlled to Pn. T° C. and Pn will be described later in detail.

In the next step, the holder carrying the base 1 on which the uneven layer 8 comprising aluminum deposits is formed is fed to a film-forming chamber B, and the base 1 is heated to 320° C. Subsequently, a 100 nm-thickness, non-magnetic metal base layer 2 made of chromium, a 20 nm-thickness, magnetic layer 3 formed from a ferromagnetic alloy, more specifically, $Co_{86}Cr_{12}Ta_2$ alloy, and a 20 nm-thickness protective layer 4 formed from amorphous carbon, for example, are formed by sputtering in the order of description. Then, the surface of the protective layer 4 is coated with a liquid lubrication agent comprising perfluoropolyether, to thus form a lubrication layer 5 having a thickness of about 1.5 nm. Thus, the magnetic recording medium 10 is produced.

Figure 8A:
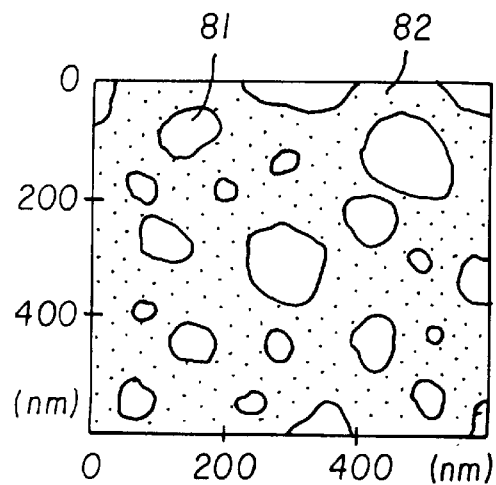
Figure 8B:
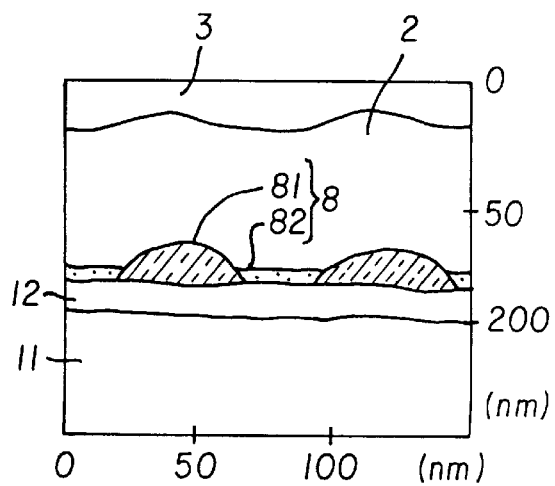
FIG. 8(b) is a view showing a cross section of the uneven layer as viewed by a transmission electron microscope (TEM)
Figure 9A:
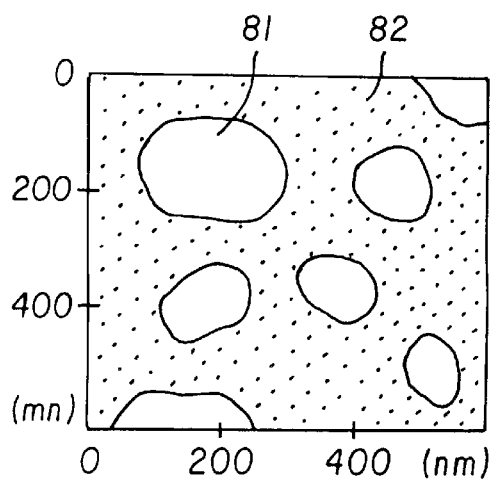
Figure 9B:
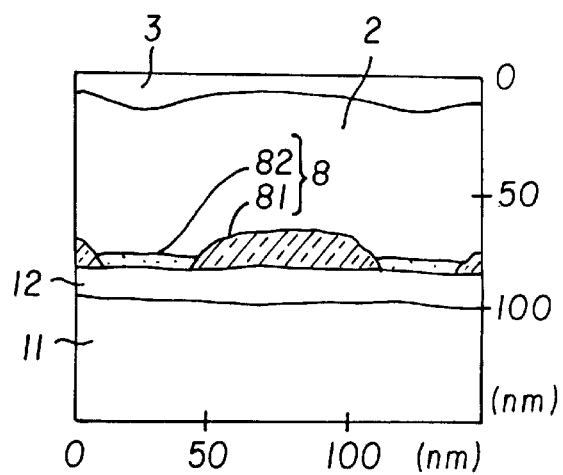
FIG. 9(b) is a view showing a cross section of the uneven layer as viewed by a transmission electron microscope (TEM)
Figure 10A:
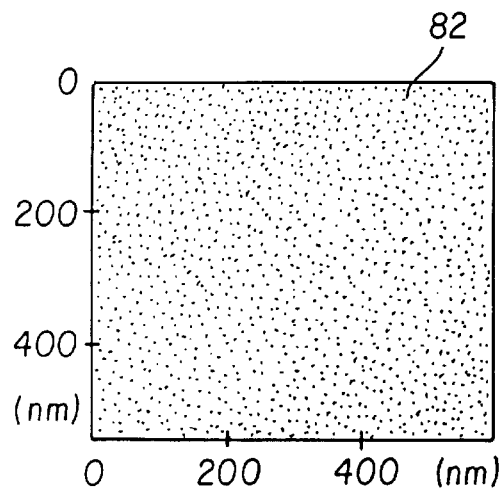
Figure 10B:
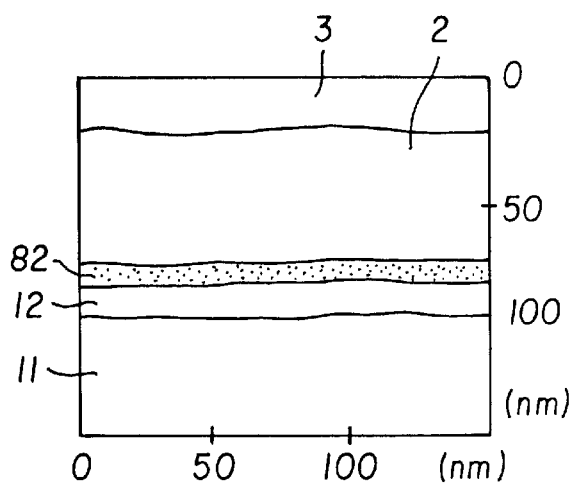
FIG. 10(b) is a view showing a cross section of the uneven layer as viewed by a transmission electron microscope (TEM)
Figure 11A:
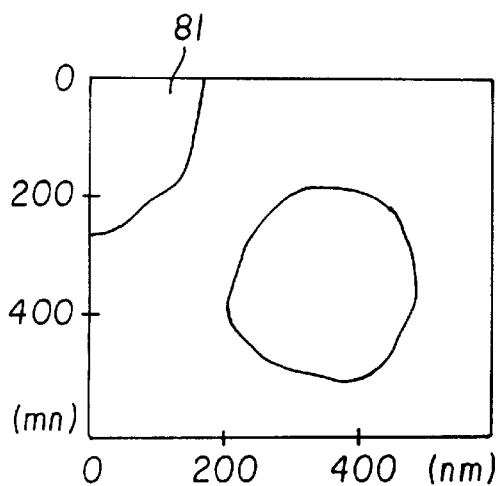
Figure 11B:
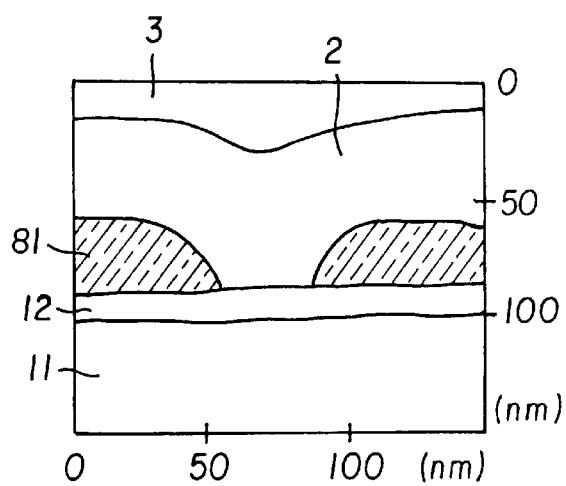
FIG. 11(b) is a view showing a cross section of the uneven layer as viewed by a transmission electron microscope (TEM)

FIG. 8(a) through FIG. 11(a) schematically show the surface condition of the uneven layer 8 formed on the non-magnetic metal buffer layer 12 as observed by an atomic force microscope (AFM). FIG. 8(b) through FIG. 8(b) schematically show the cross section of a relevant portion of the magnetic recording medium 10 as observed by a transmission electron microscope (TEM). The uneven layers 8 consisting of aluminum deposits as shown in FIGS. 2 to 5 were formed with different partial pressure ratios Pn of the $O_2$ gas to the (Ar+$O_2$) gas. That is, the uneven layers 8 as shown in FIGS. 8 and 9 were formed with Pn being equal to 3% and 20%, respectively. For comparison, the uneven layers 8 as shown in FIGS. 10 and 11 were formed with Pn being equal to 0% and 50%, respectively.

As shown in FIGS. 8 through 11, the unevenness or irregularities of the uneven layer 8 as the aluminum deposits containing oxygen is given by the crystalline-phase, mutually isolated protrusions 81 discretely distributed in the amorphous-phase connecting layer 82, which thus forms a continuous film for connecting the protrusions 81. As is apparent from FIGS. 8, 9 and 11, the diameter (grain size) of the crystalline-phase protrusions 81 tends to increase with the partial pressure ratio Pn of the $O_2$ gas to the (Ar+$O_2$) gas. If the aluminum deposits (8) do not contain nitrogen as in the example of FIG. 10, on the other hand, the uneven layer 8 formed from the aluminum deposits consists of a single amorphous-phase connecting layer 82 having minute protrusions and recesses. If the aluminum deposits (8) contain a large amount of oxygen, as in the example of FIG. 11, the uneven layer 8 formed from the aluminum deposits consists solely of discretely distributed, mutually isolated protrusions 81 with the crystalline phase, which form protrusions and recesses of larger size and are similar to those of the conventional uneven layer 6 as shown in FIG. 15. Each of the uneven layers 8 as shown in FIGS. 8 and 9 consists of the crystalline-phase, mutually isolated protrusions 81 having a suitable particle size, and the amorphous-phase connecting layer 82 which fills spaces between the protrusions 81 with a relatively small thickness. Since the amorphous-phase connecting layer 82 forms a continuous film for connecting the discretely dispersed, mutually isolated protrusions 81 with each other, the uneven layer 8 exhibits excellent adhesiveness with respect to its upper and lower layers, that is, the metal base layer 2 and the non-magnetic metal buffer layer 12.

More specifically, the amorphous-phase portion 82 of the uneven layer 8 exhibits a higher adhesive strength with respect to the upper and lower layers 2, 12, than the crystalline-phase portion 81 thereof. Therefore, the uneven layer 8 is effectively prevented from peeling off from these layers 2, 12. In the present examples of FIGS. 8 and 9, the entire surface of the buffer layer 12 is covered with the uneven layer 8 as a continuous film, which serves as an isolation film, with the result of no contact between the buffer layer 12 and the metal base layer 2. Accordingly, the present magnetic recording medium can be constructed without carefully considering the compatibility of materials for the upper and lower layers 2, 12 adjacent to the uneven layer 8. Therefore, the same material, such as chromium, can be used for forming both the non-magnetic metal buffer layer 12 and the non-magnetic metal base layer 2, and the film-forming process is thus simplified, resulting in an improved manufacturing efficiency.

With respect to the magnetic recording medium having the uneven layer 8 in the form of aluminum deposits containing oxygen, the maximum crystal grain size D of the crystalline-phase layer 81 was varied, and some characteristics of the resulting magnetic recording medium 10 were observed. The results of this test are shown in TABLE 2.

TABLE 2

| D (nm) | 5 | 7 | 10 | 100 | 300 | 350 |
|---|---|---|---|---|---|---|
| Rmax (nm) | 6.2 | 8.9 | 10 | 31 | 48 | 61 |
| $\mu$ | X | Δ | ○ | ○ | ○ | ○ |
| Flotation characteristic | ○ | ○ | ○ | ○ | ○ | X |

The characteristics indicated in TABLE 2 are the same as those of TABLE 1.

It will be understood from TABLE 2 that the surface roughness of the magnetic recording medium as represented by "Rmax" increases with the crystal grain size "D". Accordingly, the recording medium has a relatively smooth surface when the crystal grain size "D" is small, which means that the magnetic head is excellent in terms of its flotation characteristic, but is poor in its friction characteristic. On the other hand, the recording medium has a relative rough surface when "D" is large, which means that the magnetic head is excellent in terms of the friction characteristic, but is poor in the flotation characteristic. To achieve a magnetic recording medium which is satisfactory both in the friction characteristic and floating characteristic, the maximum roughness "Rmax" needs to be controlled to be within the range of 10 nm to 48(50)nm. To this end, the maximum diameter "D" of the crystalline-phase protrusions 81 of the uneven layer 8 is preferably controlled to be within the range of 10 nm to 300 nm.

Figure 12:
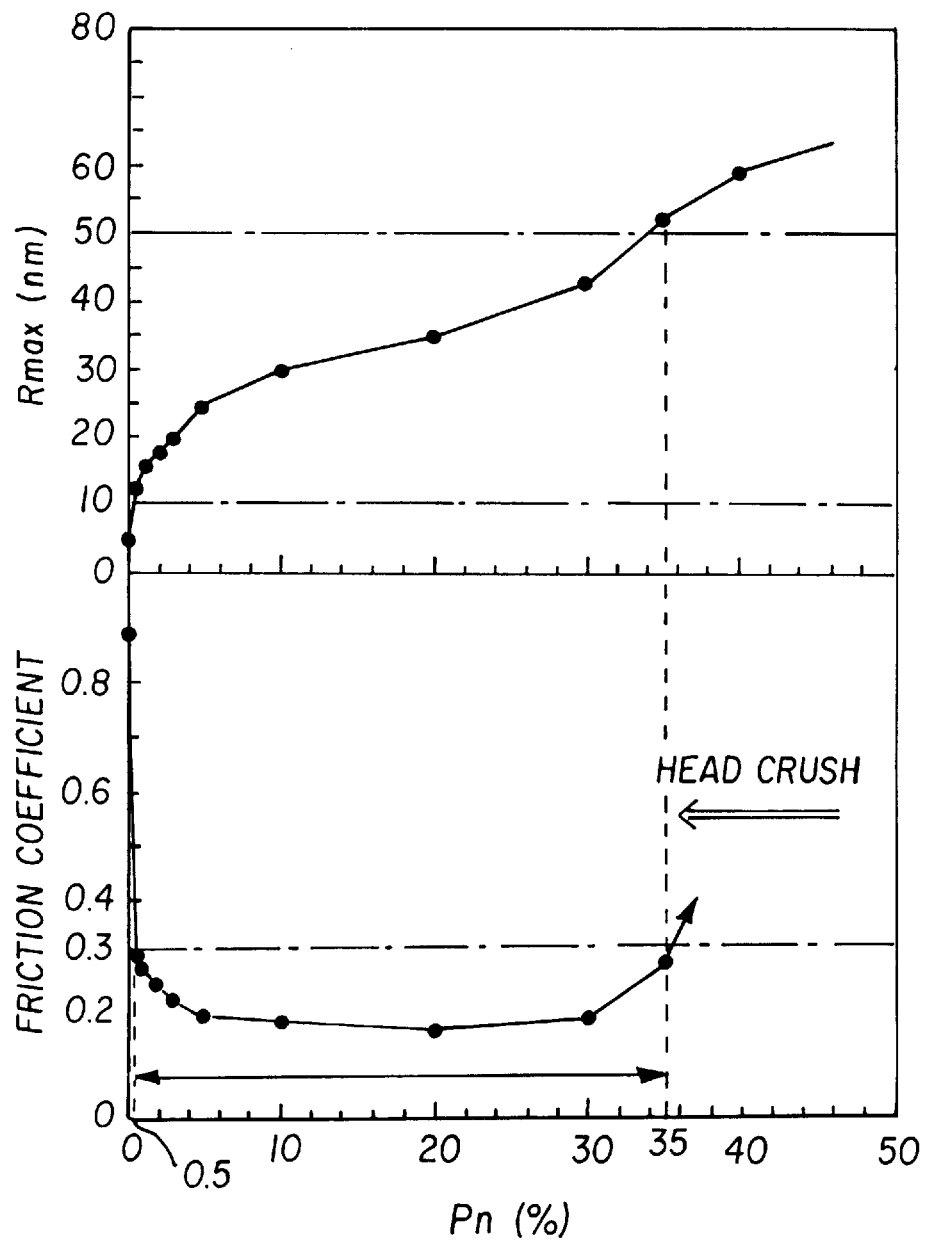
FIG. 12 is a graph showing changes of the maximum roughness "Rmax" of the magnetic recording medium, and the coefficient of friction "$\mu$" as measured after the CSS motion was conducted 50,000 times, as the partial pressure ratio "Pn" of $O_2$ gas in (Ar+$O_2$) gas used during formation of the uneven layer of the second embodiment was varied.

The graph of FIG. 12 shows changes of the maximum roughness "Rmax" of the magnetic recording medium, and the coefficient of friction "$\mu$" as measured after the CSS motion was conducted 50,000 times, as the partial pressure ratio "Pn" of the $O_2$ gas in the (Ar+$O_2$) gas used during formation of the uneven layer 8 was varied.

When the uneven layer 8 was formed with the partial pressure ratio "Pn" of the $O_2$ gas being in the range of 2 to 35%, the coefficient of friction "$\mu$" was advantageously 0.3 or lower, and the maximum roughness of the medium surface was kept in the range of 10 nm and 50 nm, as shown in FIG. 12. Thus, the resulting magnetic recording medium was excellent both in its friction characteristic and flotation characteristic, as is apparent from TABLE 2 above. If the partial pressure ratio of the $O_2$ gas is less than 2%, the uneven layer 8 consists solely of the amorphous-phase connecting layer 82 with considerably minute protrusions and recesses, as shown in FIG. 10, resulting in an excessively large coefficient of friction. If the partial pressure ratio of the $N_2$ gas exceeds 35%, the uneven layer 8 consists solely of large-sized, discretely dispersed and mutually isolated protrusions 81 with the crystalline phase, as shown in FIG. 11. When a CSS test was conducted on this recording medium, the uneven layer 8 peeled off from the upper and lower layers, and a head crush occurred. As compared with the case of the first embodiment, the partial pressure ratio Pn of the $O_2$ gas may be within the range of 0.5 to 2%, to obtain a desired magnetic recording medium.

Figure 13:
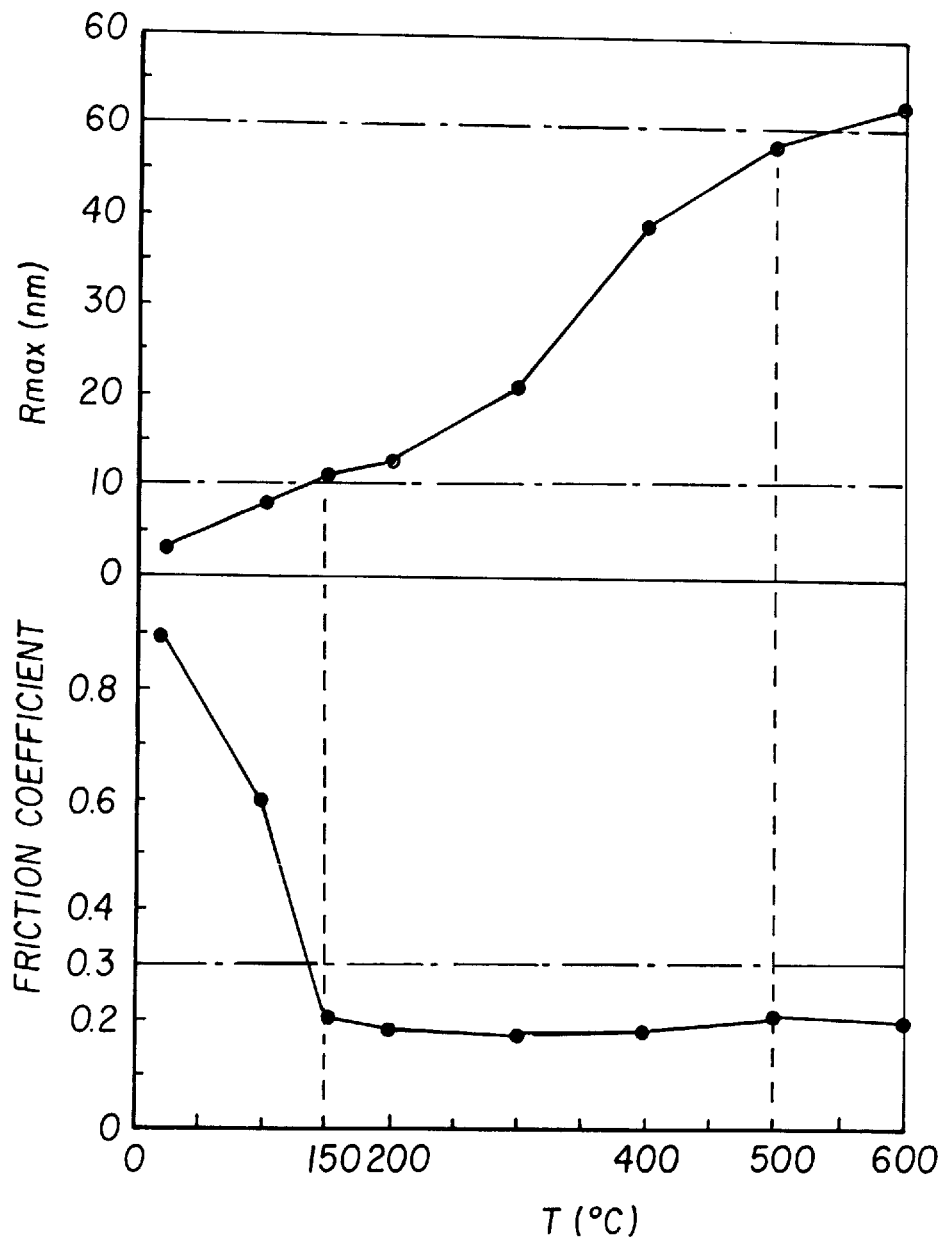
FIG. 13 is a graph showing changes of the maximum roughness "Rmax" of the magnetic recording medium, and the coefficient of friction "$\mu$" as measured after the CSS motion was conducted 50,000 times, as the temperature "T" of a glass substrate as measured during formation of the uneven layer of the second embodiment was varied.
Figure 14:
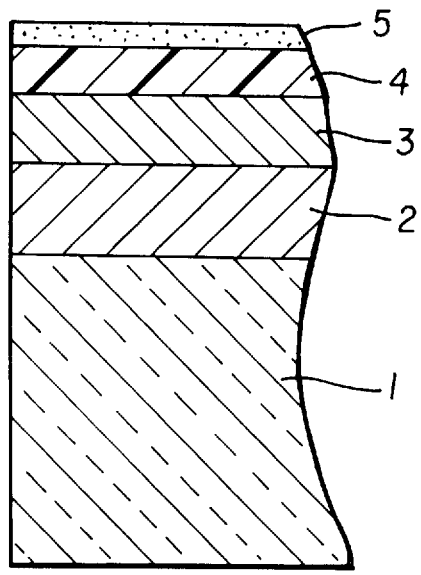
FIG. 14 is a cross sectional view schematically showing a laminar structure of a conventional magnetic recording medium.

The graph of FIG. 13 shows changes of the maximum roughness "Rmax" of the magnetic recording medium, and the coefficient of friction "$\mu$" as measured after the CSS motion was conducted 50,000 times, as the temperature "T" of the base 1 as measured during formation of the uneven layer 1 was varied.

As is apparent from FIG. 13, when the uneven layer 8 was formed with the temperature "T" of the base 1 being in the range of 150° to 500° C., the coefficient of friction "$\mu$" was advantageously 0.3 or lower, and the maximum roughness of the medium surface was kept in the range of 10 nm and 50 nm. Thus, it is apparent from TABLE 2 above that the resulting magnetic recording medium was excellent both in its friction characteristic and flotation characteristic. Thus, the present embodiment allows a wider range of appropriate temperature, making it easier to control the temperature of the base, as compared with the case of the first embodiment.

In the illustrated embodiments, the uneven layer 8 in the form of metal deposits is formed of aluminum as a non-magnetic metal. However, the metal for forming the layer 8 is not limited to low-melting-point metals, but may be selected from a group consisting of Ta, Ti, Ag, Cu, Pb, Si, B, Zr and Cr, as well as Al, and alloys including two or more of these metals. While the glass substrate is used as a substrate (11) of the non-magnetic base 1 in the illustrated embodiment, it may be replaced by a ceramic substrate, or a substrate made of Ti, C, or Si, or an aluminum substrate plated with Ni and P.

As explained above, the uneven layer of the magnetic recording medium according to the present invention is formed from metal deposits containing nitrogen or oxygen, and includes not only the mutually isolated protrusions having a crystalline phase, but also the connecting layer having an amorphous phase, which fills spaces between the protrusions with a small thickness so as to connect them with each other. This arrangement yields the following advantageous effects:

(1) The amorphous-phase connecting layer forms a continuous film for connecting the discretely distributed, mutually isolated protrusions with each other, thus assuring strong adhesion with respect to upper and lower layers adjacent to the uneven layer. In particular, the adhesive strength between the amorphous-phase connecting layer and the upper and lower layers is higher than that between the crystalline-phase protrusions and the upper and lower layers, whereby the uneven layer is effectively prevented from peeling off. Further, since the entire surface of the non-magnetic base is completely covered with the uneven layer which as a whole constitutes a continuous film, the uneven layer serves as an isolation film, that is, the non-magnetic base does not directly contact with the upper layer laminated on the uneven layer. Accordingly, the magnetic recording medium can be constructed without carefully considering the compatibility of the materials for the upper and lower layers sandwiching the uneven layer. Therefore, the non-magnetic metal buffer layer formed on the non-magnetic substrate can be formed of the same material as the non-magnetic metal base layer, and the manufacturing process can be thus simplified, assuring an improved manufacturing efficiency.

(2) When the metal deposits are made of aluminum, and the maximum diameter of the crystallin-phase protrusions is controlled to be within the range of 10 nm to 300 nm, the maximum height "Rmax" of the protective layer can be limited to the range of 10 nm to 50 nm, thereby to provide a desired magnetic recording medium that is excellent both in the friction characteristic and the floating characteristic.

(3) When the uneven layer in the form of aluminum deposits containing nitrogen is formed by a sputtering process, with the non-magnetic base being heated to a temperature in the range of 150° C. to 350° C., using a sputtering gas mixture of an argon gas and a nitrogen gas having a partial pressure ratio of the nitrogen gas in the range of 2% to 35%, the coefficient of friction "$\mu$" can be controlled to 0.3 or lower, and the maximum roughness "Rmax" of the medium surface can be held in the range of 10 nm to 50 nm. Thus, the resulting magnetic recording medium is excellent in terms of both the friction characteristic and the flotation characteristic.

(4) When the uneven layer in the form of aluminum deposits containing oxygen is formed by a sputtering process, with the non-magnetic base being heated to a temperature in the range of 150° C. to 500° C., using a sputtering gas mixture of an argon gas and an oxygen gas having a partial pressure ratio of the oxygen gas in the range of 0.5% to 35%, the coefficient of friction "$\mu$" can be controlled to 0.3 or lower, and the maximum roughness "Rmax" of the medium surface can be held in the range of 10 nm to 50 nm. Thus, the resulting magnetic recording medium is excellent in terms of both the friction characteristic and the flotation characteristic.

What is claimed is:

1. A magnetic recording medium comprising:
    a non-magnetic base; an uneven layer including non-magnetic metal deposits containing at least one of nitrogen and oxygen, laminated on a surface of said non-magnetic base, wherein said uneven layer includes mutually isolated protrusions having a crystalline phase, which are discretely dispersed on the surface of the non-magnetic base, and a connecting layer having an amorphous phase for filling spaces between said protrusions so as to connect the protrusions with each other;
    a non-magnetic metal base layer laminated on said uneven layer;
    a magnetic layer laminated on said non-magnetic metal base layer; and
    a protective layer laminated on said magnetic layer;
    wherein the connecting layer is thinner than the protrusions and prevents the non-magnetic base from contacting the non-magnetic metal base layer.

2. A magnetic recording medium as defined in claim 1, wherein said metal deposits comprise a single metal selected from a group consisting of Al, Ta, Ti, Ag, Cu, Pb, Si, B, Zr and Cr.

3. A magnetic recording medium as defined in claim 1, wherein said metal deposits comprise an alloy of two or more of Al, Ta, Ti, Ag, Cu, Pb, Si, B, Zr and Cr.

4. A magnetic recording medium as defined in claim 1, wherein said non-magnetic base comprises a non-magnetic substrate and a non-magnetic metal buffer layer laminated on the non-magnetic substrate.

5. A magnetic recording medium as defined in claim 2, wherein said metal deposits are made of Al, and said mutually isolated protrusions have a maximum diameter in a range of 10 nm to 300 nm.

6. A method of manufacturing a magnetic recording medium, comprising the steps of:

forming an uneven layer including non-magnetic metal deposits containing nitrogen on a surface of a non-magnetic base, by a sputtering process conducted in a sputtering gas mixture comprising an argon gas and a nitrogen gas, with said non-magnetic base heated to a predetermined temperature, said uneven layer including mutually isolated protrusions having a crystalline phase, which are discretely dispersed on the surface of the non-magnetic base, and a connecting layer having an amorphous phase for filling spaces between said protrusions so as to connect the protrusions with each other, and wherein the connecting layer is thinner than the protrusions and prevents the non-magnetic base from contacting the non-magnetic metal base layer;

laminating a non-magnetic metal base layer on said uneven layer;

laminating a magnetic layer on said non-magnetic metal base layer; and laminating a protective layer on said magnetic layer.

7. A method as defined in claim 6, wherein said metal deposits are made of Al, and said predetermined temperature to which said non-magnetic base is heated is within a range of 150° C. to 350° C., said sputtering gas mixture having a partial pressure ratio of the nitrogen gas in a range of 2% to 35%.

8. A method of manufacturing a magnetic recording medium, comprising the steps of:

forming an uneven layer including non-magnetic metal deposits containing oxygen on a surface of a non-magnetic base, by a sputtering process conducted in a sputtering gas mixture comprising an argon gas and an oxygen gas, with said non-magnetic base heated to a predetermined temperature, said uneven layer including mutually isolated protrusions having a crystalline phase, which are discretely dispersed on the surface of the non-magnetic base, and a connecting layer having an amorphous phase for filling spaces between said protrusions so as to connect the protrusions with each other, and wherein the connecting layer is thinner than the protrusions and prevents the non-magnetic base from contacting the non-magnetic metal base layer;

laminating a non-magnetic metal base layer on said uneven layer;

laminating a magnetic layer on said non-magnetic metal base layer; and laminating a protective layer on said magnetic layer.

9. A method as defined in claim 8, wherein said metal deposits are made of Al, and said predetermined temperature to which said non-magnetic base is heated is within a range of 150° C. to 500° C., said sputtering gas mixture having a partial pressure ratio of the oxygen gas in a range of 0.5% to 35%.

10. A method as claimed in claim 6, wherein the sputtering gas mixture has a pressure of 20 mTorr.

11. A method as claimed in claim 8, wherein the sputtering gas mixture has a pressure of 10 mTorr.

* * * * *